May 12, 1970 KAZUHISA SATO 3,510,962
MOLECULAR STRUCTURE MODELS
Filed July 3, 1967 2 Sheets-Sheet 1
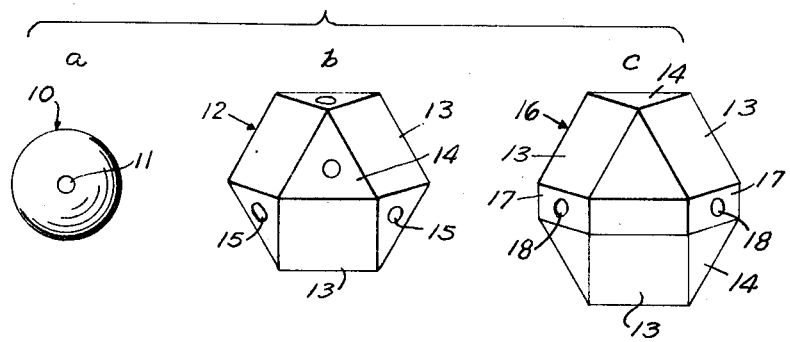
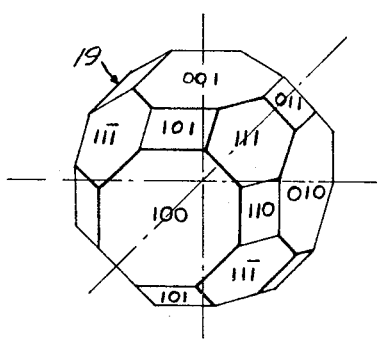
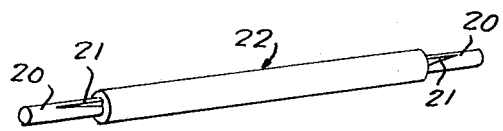
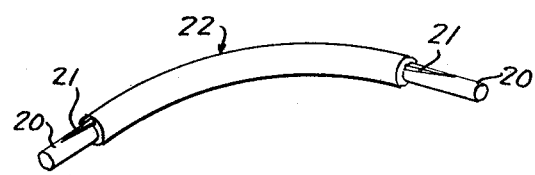
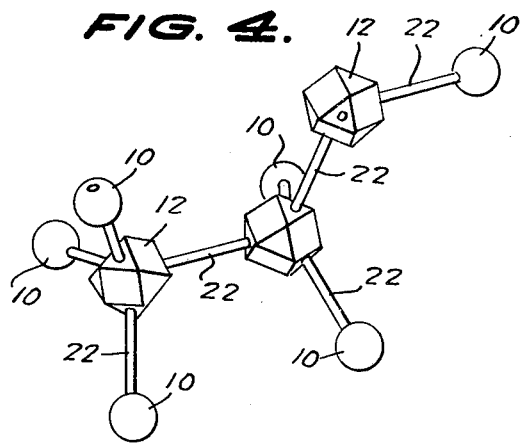
INVENTOR.
KAZUHISA SATO,
BY
*Linton and Linton*
ATTORNEYS.

May 12, 1970            KAZUHISA SATO           3,510,962

MOLECULAR STRUCTURE MODELS

Filed July 3, 1967                           2 Sheets-Sheet 2

INVENTOR.
KAZUHISA SATO,
BY
*Linton and Linton*
ATTORNEYS.

United States Patent Office 3,510,962
Patented May 12, 1970

3,510,962
MOLECULAR STRUCTURE MODELS
Kazuhisa Sato, 1-10-24 Meguro-honcho, Meguro-ku,
Tokyo, Japan
Filed July 3, 1967, Ser. No. 654,042
Int. Cl. G09b 23/26
U.S. Cl. 35—18                    3 Claims

ABSTRACT OF THE DISCLOSURE

A molecular structure educational model for use in teaching stereo-chemistry using polyhedral block members representing atoms in molecules and rod members insertable in holes in said polyhedral block members for interconnecting the same and illustrating bond lengths and bond angles in molecules.

---

The present invention is particularly directed to polyhedrons having 14, 20 or 26 facets. The blocks and rods may be made of plastic or metal.

The present invention relates to educational molecular or crystal structure models for use in teaching stereo chemistry and more particularly to improved molecular structure models wherein polyhedral balls or blocks or objects are utilized for representing atoms in molecules, and rod members connect said polyhedral balls and illustrate bond lengths and bond angles in molecules.

There have been known heretofore various types of educational molecular structure models which three-dimensionally represent structures of organic or inorganic molecules. Normally, such molecular structure models in the past have been assembled by employing a plurality of regular spherical balls which represent the atoms in a molecule and a plurality of bonds which connect these spherical balls together showing the atomic distances as well as the bond angles in the molecule. However, because of the complication of many molecular structures, it has not been possible heretofore to prepare such molecular structure models satisfactorily enough for research purposes, and even if that were possible, manufacture of such high quality models would cost so much that the price would not be within the reach available for many students and general researchers.

In the manufacture of such molecular structure models, the first problem to be met consists in how to orient the various bond angles of the model to represent the actual bond angles of the molecules, and because of this difficulty, mass production of such models has not been accomplished heretofore.

The second problem resides in the connections between the spherical and polyhedral ball members and the bond members. A tight but rotatable telescopic engagement of these members is required. None of the known conventional models solves this problem satisfactorily.

The development of the present invention has revealed that by the use of polyhedral ball members instead of the spherical ball members heretofore used, the first problem mentioned can be satisfactorily solved. That is, rod members extending perpendicularly from the facets of a polyhedral ball member provide substantially all possible bond angles in molecular structures and in crystal structures. However, spherical balls of the conventional model type may be used for simple problems representing atoms having a relatively small number of bonds, such as hydrogen atoms.

Improvements of the present invention are directed also to the engagement between the spherical and polyhedral ball members and the rod members thereby to minimize the difficulty in the second problem mentioned.

It is therefore, the primary object of the present invention to provide means for providing any desired rod angles for representing the respective bond angles in a particular molecular or crystal educational model structure.

It is another object of the present invention to provide means for affording efficient telescopic interengagement between the spherical and polyhedral ball members and the rod members.

Still another object of the present invention is to provide low-priced molecular structure educational model sets through easy production techniques that permit the mass production of the elements of the models.

The polyhedral ball members of this present invention are preferably of 14, 20, or 26 facets. On the facels of such a member, a hole is drilled taking into consideration the necessity for receiving a joint portion of a rod member which extends to and joins to another ball member thereby representing the atomic distance between the two adjacent atoms in the molecule. The hole extends inwardly perpendicularly to the facet of the polyhedral ball member and may run through the ball member to the reverse side facet thereof.

The polyhedral adn spherical ball members are preferably made of a plastic material having resilience as well as abrasion resistance, such as acrylic and melamine resins.

The rod members may be made of a plastic material having resilience, abrasion resistance, and processing ease such as polyacetal resins, or of a metallic material having resilience, processing ease and mechanical strength such as brass.

The connecting rod member has a recess terminal joint portion at each end which is smaller in diameter than the main central part of the rod. This joint portion of the plastic rod is provided with very tiny projecting wings which serve as a cushion for the engagement between the ball members and the rod members whereby a tight but rotatable telescopic engagement of these members can be effectively accomplished.

In the case of a metallic rod, the hole in the ball which the metallic rod engages, is drilled to have two different bores, one receiving and corresponding to the diameter of the terminal joint portion of the metallic rod, and the other corresponding to the main intermediate part of the rod. Thus, when the ball and rod members are connected finally, a tight but rotatable engagement can be obtained.

The rod members are usually straight but may be curved if necessary.

The lengths of the rod members are determined in accordance with the respective known atomic distances of the molecule.

All the bond angles necessary for representing the molecular structures of the particular organic or inorganic compounds concerned are provided by selecting the particular facets of the polyhedral balls or blocks from which the rod members extend perpendicularly.

The features and objects of the present invention will be better understood from the following description taken in connection with the accompanying drawings, in which;

FIG. 1 shows suitable structures of ball members.

FIG. 1a being a spherical ball member as heretofore known.

FIG. 1b shows a polyhedron ball member having 14 facets.

FIG. 1c shows a polyhedral ball member having 20 facets.

FIG. 2 shows a polyhedron ball member having 26 facets providing for a multiplicity of rod angles.

FIGS. 3a and 3b show details of a rod member.

FIG. 4 shows a structural model of an ethyl alcohol molecule.

Figure 5:
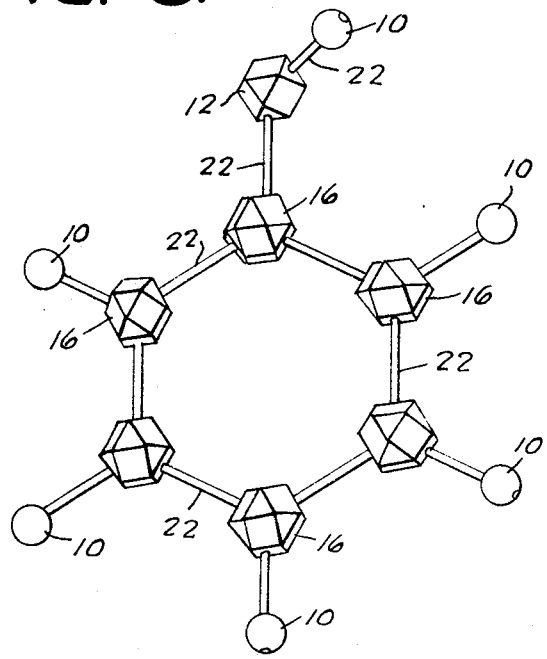
FIG. 5 shows a molecular structural model of phenol.

Referring to the drawings in detail, FIG. 1 shows various types of ball members to be used in the educational molecular structure models of this present invention. FIG. 1a shows a spherical ball member 10 of the conventional type with a hole 11 for receiving a joint portion of the bond member. This spherical ball member is used mainly for representing a hydrogen atom.

FIG. 1b shows a polyhedron ball member 12 having 14 facets and having an approximately cubic configuration with its eight corners being cut away along the straight lines connecting the centers of the adjacent ones of the twelve edges, thereby forming six square facets 13 and eight equilateral triangular facets 14. On each triangular facet, there is provided a hole 15 drilled extending normally to the facet into the center of the polyhedral ball. This polyhedral faceted ball member having fourteen facets is most important and most frequently used for the reason that almost all the basic bond angles can be produced by inserting bond members in appropriate holes on these facets, if necessary by increasing the number of holes on the polyhedral ball member.

FIG. 1c shows a modified polyhedron ball member 16 having 20 facets and being a modification of the ball member in FIG. 1b with the addition of a diametrical circumferential edge thereof provided with six rectangular facets 17 each having drilled thereon a hole 18, respectively. It is understood that with the increase in the number of facets each having the respective holes, additional values of angles may be represented.

FIG. 2 shows a faceted polyhedral ball member 19 having 26 facets with a number applied on each facet. These numbers are the familiar Miller indices whereby the angles between the adjacent facets of the polyhedral balls are three-dimensionally indicated. This FIG. 2 will be described later in a more detailed manner.

FIG. 3 shows a detail of the rod members having a recessed joint portion 20 at each end, said joint portion being provided with very tiny projection wings 21. FIG. 3a shows the usual straight rod member 22, and FIG. 3b shows a curved rod member 23 used for double bond assembly or the like. The wings 21 serve as a cushion for engagement between the rod members and the hole in the ball members.

FIG. 4 shows a molecular polyhedral structural model to represent ethyl alcohol assembled using six spherical ball members 10 representing hydrogen atoms, three polyhedral faceted ball members 12 having fourteen facets representing carbon atoms, and eight straight bond members 22 showing the relative bond lengths and bond angles.

FIG. 5 shows a molecular structure model of phenol where a plurality of six faceted polyhedron ball members 16 each having 20 facets are utilized for representing carbon atoms in a benzene ring. Six rod members having the same length connect the six faceted ball members each having 20 facets to form a plane benzene ring, each joint portion of said rod members engaging a hole drilled in a rectangular facet 17 of said polyhedral ball member.

Figure 6:
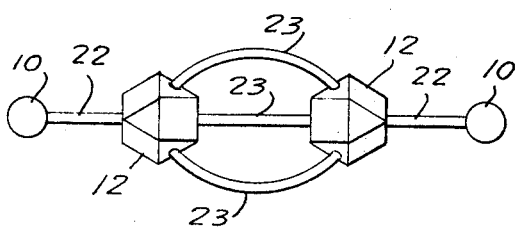
FIG. 6 shows a molecular structural model of acetylene.

FIG. 6 shows an acetylene molecular structure model wherein a triple linkage is represented by three curved rod members 23.

Figure 7:
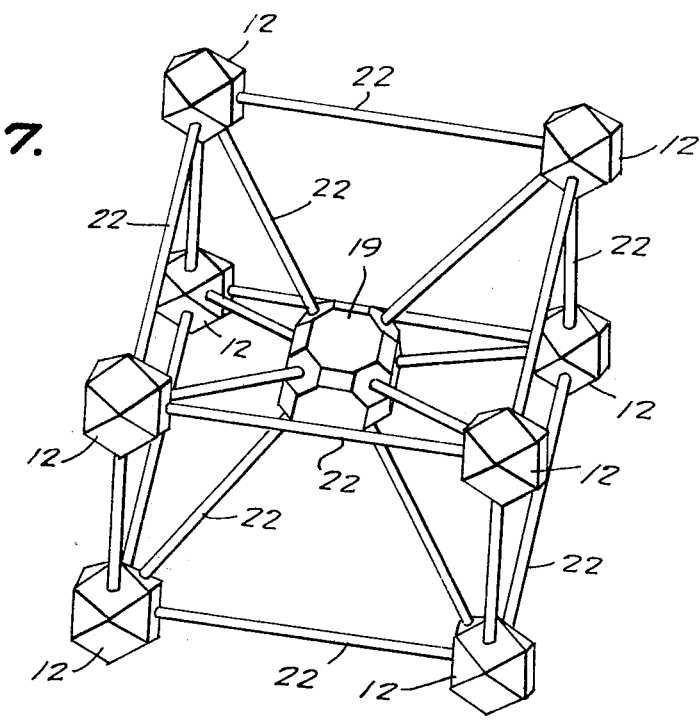
FIG. 7 shows a crystal structure model of cesium chloride in which the cesium atom is shown as a polyhedron having 26 facets.

FIG. 7 shows a crystal structure model of cesium chloride in which the center cesium atom is represented by a polyhedron faceted ball member 19 having 26 facets.

Referring now more particularly to FIG. 2, an important feature of this present invention, that is, the provision of any desired rod angles, will be explained in detail. Suppose that a hole is provided on each facet of the 26 faceted polyhedral ball member perpendicularly to the respective facet, and that a straight rod member is inserted to each hole, then the angles produced between the rod members are as follows:

| Facets indicated in FIG. 2 by the Miller indices, on which respective rod members are inserted: | Rod angles produced by the respective rod members |
|---|---|
| 110–0$\bar{1}$1 | 60° |
| 100–010 | 90° |
| 111–11$\bar{1}$ | 70° 32' |
| 111–110 | 35° 16' |
| 111–100 | 54° 44' |
| 100–110 | 45° |
| 111–1$\bar{1}\bar{1}$ | 109° 28' |
| 111–0$\bar{1}$1 | 144° 44' |
| 111–0$\bar{1}$0 | 125° 16' |
| 110–0$\bar{1}$1 | 120° |
| 111–$\bar{1}\bar{1}\bar{1}$ | 180° |

Taking the resilience of the rod members into consideration, it is easily understood that substantially all bond angles relevant to the molecular structures of organic or inorganic compounds are represented by the rod angles produced as above described. It is further understood that according to the present invention, not only molecular structures, but also more complicated crystal structures may be represented such as the face-centered cube and the body-centered cube.

The polyhedral ball members may conveniently have colors which distinguish different kinds of atoms, and the rod members may conveniently have suitable marks indicating the lengths thereof.

Various changes and modifications may be made without departing from the spirit and scope of the present invention.

Having thus described the invention, what is claimed as new and is desired to be secured by Letters Patent is:

1. A molecular structure educational model for use in teaching stereo-chemistry comprising polyhedral block members each having fourteen facets and a cubic configuration with eight corners cut away along the straight lines connecting the centers of the adjacent ones of the twelve edges forming six square facets and eight equilateral triangular facets, every pair of opposite facets of each polyhedral block member being parallel to each other, and each said facet having a hole in the center thereof perpendicular to the plane of the facet and rod members insertable in said holes interconnecting said polyhedral block members.

2. A molecular structure educational model for use in teaching stereo-chemistry comprising polyhedral block members each having twenty facets and a diametrical circumferential edge thereof provided with six rectangular facets with each facet having a hole in the center thereof perpendicular to the plane of the facet, every pair of opposite facets of each polyhedral block member being parallel to each other, and rod members insertable in said holes interconnecting said polyhedral block members.

3. A molecular structure educational model for use in teaching stereo-chemistry comprising polyhedral block members each having twenty-six facets, said facets having Miller indices thereon whereby the angles between the adjacent facets are three-dimensionally indicated, every pair of opposite facets of each polyhedral block member being parallel to each other, and each said facet having a hole in the center thereof perpendicular to the plane of the facet and rod members insertable in said holes interconnecting said polyhedral block members.

(References on following page)

References Cited

UNITED STATES PATENTS

| | | | |
|---|---|---|---|
| 144,124 | 10/1873 | Oberndorf | 46—29 |
| 1,472,536 | 10/1923 | Thomson. | |
| 2,709,318 | 5/1955 | Benjamin | 46—26 |
| 2,799,118 | 7/1957 | Lullo | 46—26 |
| 2,843,971 | 7/1958 | Gardellin | 46—26 |
| 2,920,400 | 1/1960 | Subluskey | 35—18 |
| 2,984,036 | 5/1961 | Adler. | |
| 3,230,643 | 1/1966 | Mathus | 35—18 |

FOREIGN PATENTS

| | | |
|---|---|---|
| 1,076,501 | 4/1954 | France. |
| 1,425,234 | 12/1965 | France. |

OTHER REFERENCES

Chicago Apparatus Co., catalogue No. 55, p. 682 only.

EUGENE R. CAPOZIO, Primary Examiner

H. S. SKOGQUIST, Assistant Examiner

U.S. Cl. X.R.

46—26